US011982100B1

(12) United States Patent
Hudson-Peralta

(10) Patent No.: US 11,982,100 B1
(45) Date of Patent: May 14, 2024

(54) DEVICE FOR ATTACHING TO A DOOR OR WINDOW

(71) Applicant: Ryan Hudson-Peralta, Clinton Township, MI (US)

(72) Inventor: Ryan Hudson-Peralta, Clinton Township, MI (US)

( * ) Notice: Subject to any disclaimer, the term of this patent is extended or adjusted under 35 U.S.C. 154(b) by 0 days.

(21) Appl. No.: 18/480,664

(22) Filed: Oct. 4, 2023

(51) Int. Cl.
*E05B 1/00* (2006.01)

(52) U.S. Cl.
CPC .......... *E05B 1/0015* (2013.01); *E05B 1/0053* (2013.01)

(58) Field of Classification Search
CPC ..... E05B 1/0015; E05B 1/0053; E05B 53/001
USPC .................. 16/412, 413, 415, 422, 426, 430
See application file for complete search history.

(56) References Cited

U.S. PATENT DOCUMENTS 414,625 A * 11/1889 Andross ................. A47B 95/02 16/416
3,156,944 A * 11/1964 Bohn .................... E05B 1/0015 16/412
3,226,139 A * 12/1965 Ivins ..................... E05B 1/0015 411/929
3,410,026 A * 11/1968 Casebolt ................... E06B 3/02 16/412
3,524,215 A * 8/1970 Kurtz .................... E05B 1/0015 16/443
4,548,846 A * 10/1985 Kurtz ..................... A47B 95/02 16/443
4,686,742 A * 8/1987 Arnold .................. E05B 1/0015 294/58
4,805,263 A * 2/1989 Kurtz .................... E05B 1/0015 16/443
4,817,239 A * 4/1989 Campbell ............. E05B 1/0053 16/443
5,134,754 A * 8/1992 Vickers .................. A47B 95/02 16/416
6,189,183 B1 * 2/2001 Hartselle, III ........ E05B 1/0069 16/412
6,382,750 B1 * 5/2002 King ....................... E06B 5/006 312/319.9
7,043,800 B2 * 5/2006 Moody ................. E05B 53/001 16/901
7,374,319 B2 * 5/2008 Camarota ........... E04F 11/1804 362/399
7,938,464 B1 * 5/2011 Hielm ................... E05B 1/0053 294/175
8,365,360 B2 * 2/2013 Kunnath ................ A47B 95/02 16/415
8,783,740 B1 * 7/2014 Hurt ........................ E05C 17/18 292/270
9,347,240 B2 * 5/2016 Herman ................ E05B 1/0015
9,714,524 B2 * 7/2017 Parish-Allaire ....... E05B 53/001
D845,752 S * 4/2019 Parish-Allaire ................ D8/404
11,447,979 B2 * 9/2022 Taylor ................... E05B 1/0053

(Continued)

*Primary Examiner* — Jeffrey O'Brien
(74) *Attorney, Agent, or Firm* — Sam Pierce

(57) ABSTRACT

According to an aspect of the present invention, there is provided a device for attaching to a door or window, comprising: a flat surface configured to attach to a door or window; an adhesive applied to the flat surface; a diagonal surface; a concave surface connecting the diagonal surface and the flat surface; and a solid body positioned between the flat surface, the diagonal surface, and the concave surface. The device may alternatively have one or more screw holes spanning the thickness of the device.

7 Claims, 2 Drawing Sheets

(56) References Cited

U.S. PATENT DOCUMENTS

| | | | | |
|---|---|---|---|---|
| 2006/0282986 | A1* | 12/2006 | Kim | E05B 1/0015 16/412 |
| 2010/0146737 | A1* | 6/2010 | Kunnath | A47B 95/02 16/415 |
| 2010/0320779 | A1* | 12/2010 | Yoo | E05B 1/0015 292/336.3 |
| 2014/0230332 | A1* | 8/2014 | Martinez Garcia | A47B 95/02 49/353 |
| 2016/0340929 | A1* | 11/2016 | Gagnon | E05B 1/0015 |
| 2020/0284081 | A1* | 9/2020 | Teeters | E05D 3/02 |
| 2022/0010585 | A1* | 1/2022 | Lin | E05B 53/001 |
| 2022/0018154 | A1* | 1/2022 | Madden | E05B 1/0015 |
| 2022/0178168 | A1* | 6/2022 | Cuartas | E05B 47/026 |
| 2022/0307286 | A1* | 9/2022 | Hagiwara | E05B 65/0035 |
| 2022/0333404 | A1* | 10/2022 | McIntire | E05B 1/0069 |
| 2023/0277032 | A1* | 9/2023 | Kremmel | E05B 1/0015 134/201 |

* cited by examiner

DEVICE FOR ATTACHING TO A DOOR OR WINDOW

BACKGROUND

Someone disabled or someone that has mobility impairment often experiences difficulty with opening and closing doors. Solutions for ameliorating this difficulty have been disclosed in the patent literature.

For example, US20040098915 discloses a fully automatic hinged residential door system suitable for quadriplegics, or other persons confined to wheelchairs. A wireless command operated through a hand held or mounted transmitter instigates a series of operations which unlocks the entry way, turns on appropriate lights, opens the door through at least ninety degrees, allows entry or egress, and responds to close commands in manual or automatic mode. The door is fail safe and can be operated automatically during power outages. A means of manual key or code operation is maintained. The system comprises a low voltage power supply, an opening device comprising electric motors, light controlling apparatus, a locking and unlocking device, force limiting hardware, and a movable door sill. The unit is compatible with all existing hinged door openings and can be retrofitted, or used as part of new construction.

U.S. Pat. No. 9,045,231 discloses a lavatory monument assembly that includes an enclosure having at least a front wall and that defines an enclosure interior, and a divider wall that extends rearwardly from the front wall. The divider wall includes a divider door that is movable between closed and open positions. In the closed position the divider door divides the enclosure interior into a first lavatory interior and a second lavatory interior. The front wall includes a first and second lavatory doors that are each movable between closed and open positions and provide access to the first lavatory interior and second lavatory interiors respectively. The front wall also includes a vertically extending center post. The second lavatory door is hingedly connected to the center post, and the center post and the second lavatory door are slidable to a stowed position when the second lavatory door is in the open position.

Such solutions however are expensive and impractical to implement for every public doorway. Improved devices for enabling someone disabled or someone that has mobility impairment to close and open doors and windows are urgently needed.

SUMMARY OF INVENTION

Therefore, the present invention provides a device which greatly eases the burden on someone disabled or someone that has mobility impairment persons in closing and opening doors and windows.

According to an aspect of the present invention, there is provided a device for attaching to a door or window, comprising: a flat surface configured to attach to a door or window; an adhesive applied to the flat surface; a diagonal surface; a concave surface connecting the diagonal surface and the flat surface; and a solid body positioned between the flat surface, the diagonal surface, and the concave surface.

According to another aspect of the present invention, there is provided a device for attaching to a door or window, comprising: a flat surface configured to attach to a door or window; a diagonal surface; a concave surface connecting the diagonal surface and the flat surface; a solid body positioned between the flat surface, the diagonal surface, and the concave surface; and one or more screw holes spanning the thickness of the device.

According to yet another aspect of the present invention, there is provided a method for making a door or window accessible to a disabled person, comprising: providing a device comprising: a flat surface configured to attach to a door or window; a diagonal surface; a concave surface connecting the diagonal surface and the flat surface; and a solid body positioned between the flat surface, the diagonal surface, and the concave surface; and attaching the device to the door or window.

DETAILED DESCRIPTION

The present invention is useful with both doors and windows. While it may be especially useful for someone disabled or someone that has mobility impairment, any individual may find the present invention convenient as well.

A door handle is typically permanently mounted to a door and used to open it. A door handle may provide limited utility for a wheelchair user in closing the door after the wheelchair user has gone through. Furthermore, particularly in public spaces, placement of door handles may not be customized for disabled persons.

Hence, the present invention provides a "Door Nub" which a disabled individual can use to pull a door closed after going through. Door Nub can be mounted at any height.

Windows often do not have an easily accessible handle for a person for someone disabled or someone that has mobility impairment. Thus, the Door Nub can also be mounted with a variety of window types to provide a disabled person an easy way to open and close the window.

The Door Nub is optimally shaped for its intended purpose. A flat surface is necessary to attach to a door or window. A concave surface is desirable for a disabled person to grab hold. A diagonal surface connects the concave surface and the flat surface. A solid body positioned between the flat surface, the diagonal surface, and the concave surface to provide sufficient leverage to close or open the door or window. The shape is designed both for persons with hands and persons without hands.

Figure 1:
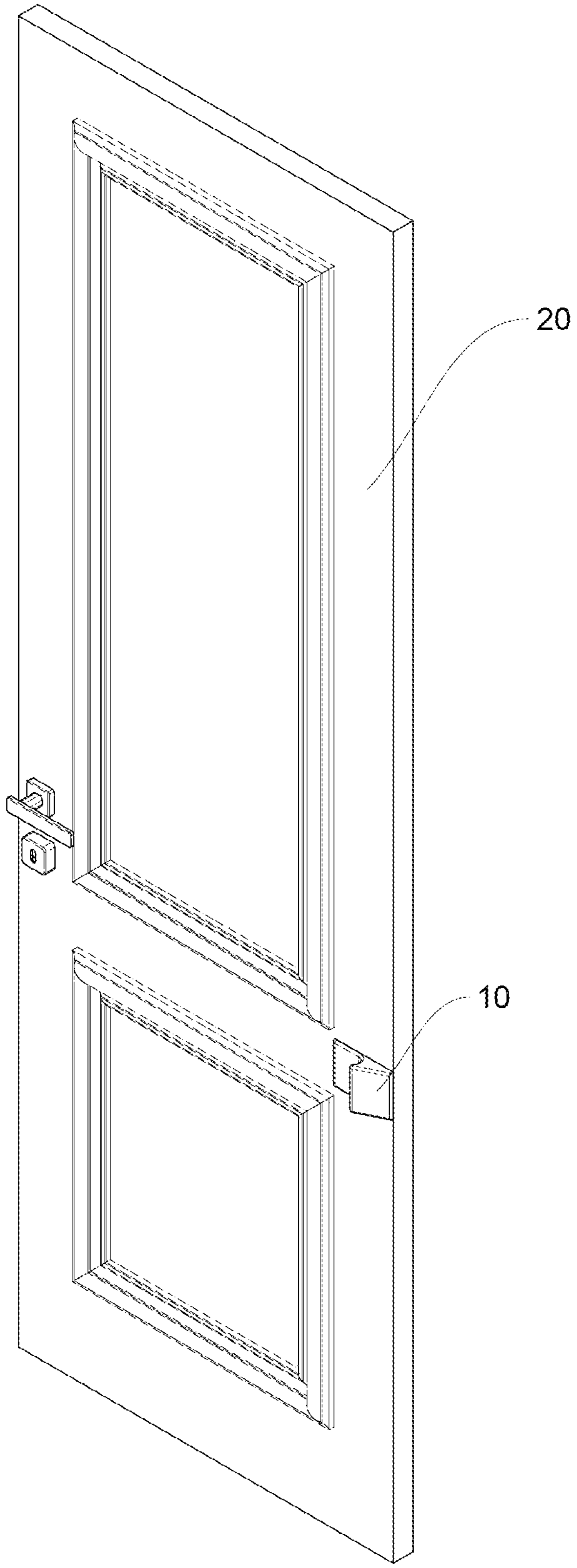
FIG. 1 illustrates an embodiment of the present invention using an adhesive back to attach to a door.

FIG. 1 illustrates an embodiment of the present invention using an adhesive back to attach to a door.

Device according to the present invention 10 is attached to door 20. For closing a door the ideal location for the Door Nub to be mounted is on the face of the door on the hinge side of the door. Door 20 opens in the opposite direction to the direction in which device 10 protrudes. A wheelchair user, after going through door 20, would typically be located nearest to device 10, and can easily reach device 10 to shut door 20 behind them.

Positioning device 10 in this location allows for maximum leverage and minimum force necessary to close the door, which is very useful for enabling many disabled persons who may have limited arm strength and dexterity to close door 20.

In FIG. 1, device 10 is attached to door 20 with an adhesive. Using an adhesive makes it easier for disabled persons with limited arm strength and dexterity to easily position device 10 themselves.

Figure 2:
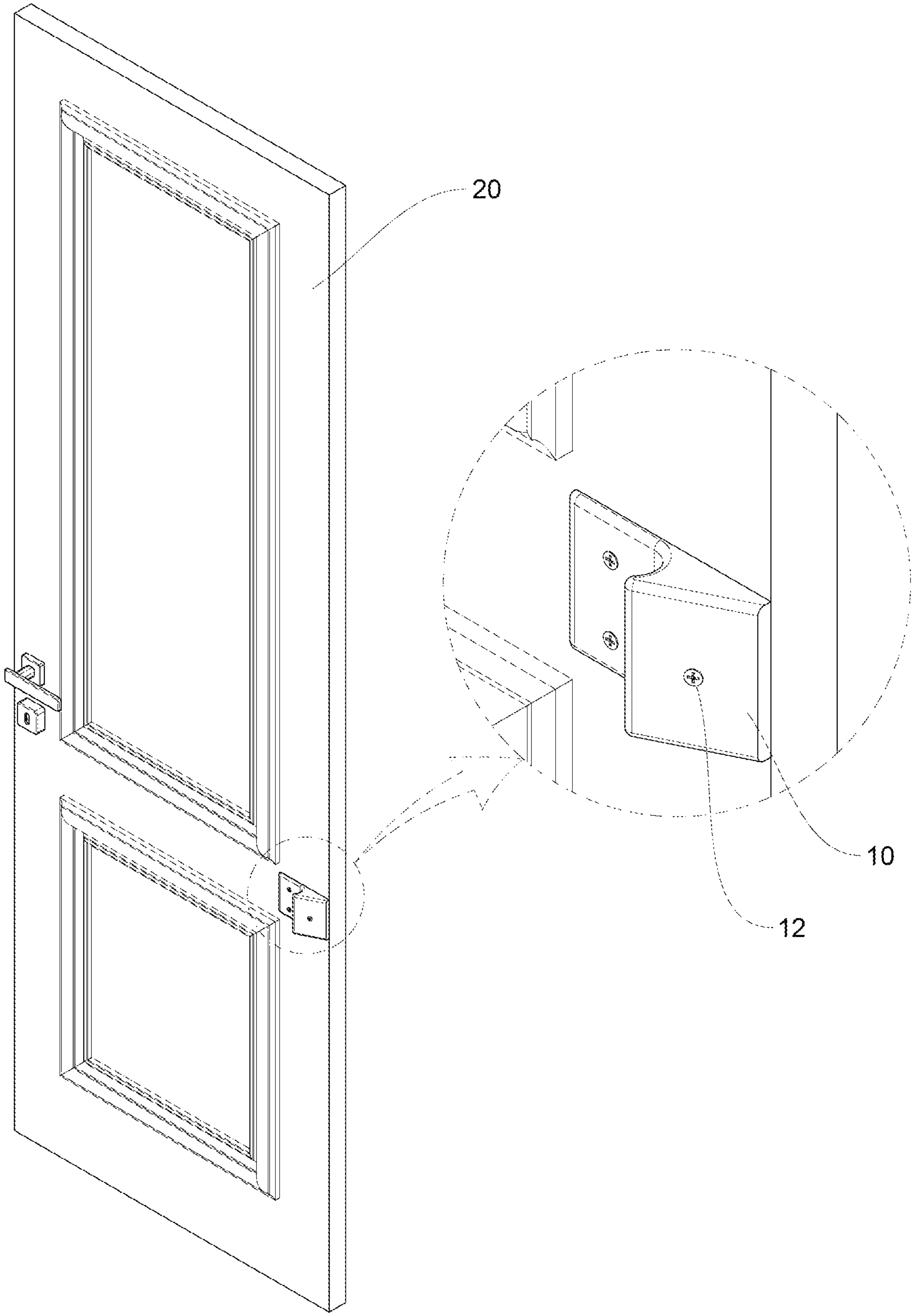
FIG. 2 illustrates an embodiment of the present invention using screw holes and screws to attach to a door.

FIG. 2 illustrates an embodiment of the present invention using screw holes and screws to attach to a door.

In FIG. 2, device 10 is attached to door 20 by screw(s) 12. It is also possible that one or more screws could be used to attach device 10 to door 20 in addition to adhesives.

Screw holes and screws might be used by, for example, construction workers in an initial build or retrofit or friends or family or home health care workers, but could also be used by a disabled person with sufficient strength and dexterity to utilize screws in such a fashion.

Many embodiments of the present invention are possible with many different types of doors and windows.

For example, device 10 can be applied to interior doors including swinging doors hinged on one side that swing open and closed; pocket doors, i.e., sliding doors that disappear into a wall recess when opened; French double doors with glass panels that open outward or inward; bi-fold doors, doors that fold in half and slide on a track for space-saving; and bathroom stall doors, hinged doors that provide privacy in individual bathroom stalls within public restrooms.

Device 10 can also be applied to exterior doors including front or back doors; any entrance door to a home or office; and sliding patio doors, sliding or hinged doors designed for access to patios or decks.

Device 10 can also be used with cabinet doors and appliance doors including refrigerator doors, dishwasher doors and many other types.

Device 10 is useful with windows including sliding windows, such as vertical and horizontal sliding windows. Door Nub can be mounted on the glass or frame. It can be turned vertically or horizontally depending on the orientation of the window.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A pull device for attaching to a door or window, comprising:

a flat portion comprising a first flat surface configured to attach to a door or window and a second flat surface opposite the first flat surface;

an adhesive applied to the first flat surface;

a diagonal portion comprising a diagonal surface extending at an acute angle with respect to the flat portion from a first end proximal to the first flat surface to a second end distal from the first flat surface, wherein the second end of the diagonal surface is a rounded end;

a solid wedge-shaped body formed between the first flat surface and the diagonal surface; and a recess extending into the solid wedge-shaped body, the recess comprising a concave surface directly connecting the rounded end of the diagonal surface and the second flat surface forming an opening for insertion of a hand or an end of a limb, wherein the concave surface is a curved surface with a concave curvature between the diagonal surface and the second flat surface;

wherein the diagonal portion has a shorter longitudinal length than a longitudinal length of the flat portion.

2. The pull device of claim 1, wherein the device is made of a material comprising plastic.

3. A pull device for attaching to a door or window, comprising:

a flat portion comprising a first flat surface configured to attach to a door or window and a second flat surface opposite the first flat surface;

a diagonal portion comprising a diagonal surface extending at an acute angle with respect to the flat portion from a first end proximal to the first flat surface to a second end distal from the first flat surface, wherein the second end of the diagonal surface is a rounded end;

a solid wedge-shaped body formed between the first flat surface and the diagonal surface; and a recess extending into the solid wedge-shaped body, the recess comprising a concave surface directly connecting the rounded end of the diagonal surface and the second flat surface forming an opening for insertion of a hand or an end of a limb, wherein the concave surface is a curved surface with a concave curvature between the diagonal surface and the second flat surface;

wherein the diagonal portion has a shorter longitudinal length than a longitudinal length of the flat portion; and one or more screw holes spanning a thickness of the solid wedge-shaped body and the flat portion.

4. The pull device of claim 3, wherein the device is made of a material comprising metal.

5. A method for making a door or window accessible to a disabled person, comprising:

providing a pull device comprising:

a flat portion comprising a first flat surface configured to attach to a door or window and a second flat surface opposite the first flat surface;

a diagonal portion comprising a diagonal surface extending at an acute angle with respect to the flat portion from a first end proximal to the first flat surface to a second end distal from the first flat surface, wherein the second end of the diagonal surface is a rounded end;

a solid wedge-shaped body formed between the first flat surface and the diagonal surface; and a recess extending into the solid wedge-shaped body, the recess comprising a concave surface directly connecting the rounded end of the diagonal surface and the second flat surface forming an opening for insertion of a hand or an end of a limb, wherein the concave surface is a curved surface with a concave curvature between the diagonal surface and the second flat surface;

wherein the diagonal portion has a shorter longitudinal length than a longitudinal length of the flat portion; and attaching the pull device to the door or window.

6. The method of claim 5, wherein attaching the pull device to the door or window comprises using an adhesive applied to the first flat surface to stick the device to the door or window.

7. The method of claim 5, wherein attaching the pull device to the door or window comprises using screws running through screw holes in the pull device to screw the device into the door or window.

* * * * *